(12) United States Patent
McDonald et al.

(10) Patent No.: US 7,369,019 B2
(45) Date of Patent: May 6, 2008

(54) RF BACKSCATTER TRANSMISSION WITH ZERO DC POWER CONSUMPTION

(75) Inventors: Mark Douglas McDonald, Campbell, CA (US); Sunit Saxena, Monte Sereno, CA (US); Anurag Goel, Foster City, CA (US)

(73) Assignee: Altierre Corporation, San Jose, CA (US)

( * ) Notice: Subject to any disclaimer, the term of this patent is extended or adjusted under 35 U.S.C. 154(b) by 107 days.

(21) Appl. No.: 11/019,494

(22) Filed: Dec. 20, 2004

(65) Prior Publication Data

US 2005/0152292 A1 Jul. 14, 2005

Related U.S. Application Data

(60) Provisional application No. 60/530,823, filed on Dec. 18, 2003, provisional application No. 60/530,819, filed on Dec. 18, 2003, provisional application No. 60/530,818, filed on Dec. 18, 2003, provisional application No. 60/530,817, filed on Dec. 18, 2003, provisional application No. 60/530,816, filed on Dec. 18, 2003, provisional application No. 60/530,795, filed on Dec. 18, 2003, provisional application No. 60/530,784, filed on Dec. 18, 2003, provisional application No. 60/530,783, filed on Dec. 18, 2003, provisional application No. 60/530,782, filed on Dec. 18, 2003, provisional application No. 60/530,790, filed on Dec. 18, 2003.

(51) Int. Cl.
*H03H 7/38* (2006.01)
(52) U.S. Cl. ............... 333/206; 333/32; 333/17.3
(58) Field of Classification Search ............... 333/32, 333/17.3, 206, 33–35, 263
See application file for complete search history.

(56) References Cited

U.S. PATENT DOCUMENTS

| | | | |
|---|---|---|---|
| 3,609,741 A | 9/1971 | Miller | |
| 4,303,910 A | 12/1981 | McCann | |
| 4,740,779 A | 4/1988 | Clearly et al. | |
| 4,888,709 A | 12/1989 | Revesz et al. | |
| 4,896,319 A | 1/1990 | Lidinsky et al. | |
| 5,151,684 A | 9/1992 | Johnsen | |
| 5,241,467 A | 8/1993 | Failing et al. | |
| 5,424,692 A * | 6/1995 | McDonald | 333/32 |
| 5,510,602 A | 4/1996 | Evans et al. | |
| 5,539,393 A | 7/1996 | Barfod | |
| 5,668,560 A | 9/1997 | Evans et al. | |
| 5,686,902 A | 11/1997 | Reis et al. | |
| 5,797,132 A | 8/1998 | Altwasser | |
| 5,821,523 A | 10/1998 | Bunte et al. | |
| 5,873,025 A | 2/1999 | Evans et al. | |
| 6,058,292 A | 5/2000 | Terreault | |
| 6,253,190 B1 | 6/2001 | Sutherland | |
| 6,269,342 B1 | 7/2001 | Brick et al. | |
| 6,307,919 B1 | 10/2001 | Yoked | |
| 6,420,961 B1 | 7/2002 | Bates et al. | |
| 6,715,675 B1 | 4/2004 | Rosenfeld | |

(Continued)

*Primary Examiner*—Benny Lee
*Assistant Examiner*—Kimberly E Glenn
(74) *Attorney, Agent, or Firm*—Swernofsky Law Group PC

(57) ABSTRACT

A method for minimizing power consumption in a wireless device which utilizes backscatter transmission in half-duplex mode, wherein a switching device is interposed between an antenna and a transmitter-receiver, and the switching device is capable of causing the antenna load impedance characteristic to be either a short, a value which substantially matches the antenna impedance, or an open, depending on the portion of the half-duplex mode.

17 Claims, 13 Drawing Sheets

U.S. PATENT DOCUMENTS

| | | |
|---|---|---|
| 6,906,599 B2 * | 6/2005 | Lu .............................. 333/32 |
| 2002/0042741 A1 | 4/2002 | Wilson, III et al. |
| 2002/0122467 A1 | 9/2002 | Camp, Jr. et al. |
| 2003/0104848 A1 | 6/2003 | Brideglall |
| 2005/0025218 A1 | 2/2005 | Briles |
| 2005/0057341 A1 | 3/2005 | Roesner |

* cited by examiner

RF BACKSCATTER TRANSMISSION WITH ZERO DC POWER CONSUMPTION

RELATED APPLICATIONS

The present invention claims the benefit of priority from the following United States provisional applications: U.S. patent Ser. No. 60/530,819 filed Dec. 18, 2003 entitled "Wireless Display Tag (WDT) Using Amplified Backscatter"; U.S. patent Ser. No. 60/530,818 filed Dec. 18, 2003 entitled "Wireless Display Tag (WDT) Using an Active Transmitter"; U.S. patent Ser. No. 60/530,817 filed Dec. 18, 2003 entitled "Wireless Display Tag (WDT) Using an Active Receiver; U.S. patent Ser. No. 60/530,816 filed Dec. 18, 2003 entitled "Wireless Display Tag (WDT) Using an Active Transmitter and Diode Receiver"; U.S. patent Ser. No. 60/530,795 filed Dec. 18, 2003 entitled "Wireless Display Tag (WDT) Using Active and Backscatter Transceivers"; U.S. patent Ser. No. 60/530,790 filed Dec. 18, 2003 entitled "Wireless Display Tag (WDT) Unit"; U.S. patent Ser. No. 60/530,783 filed Dec. 18, 2003 entitled "RF Backscatter Transmission with Zero DC-Power Consumption"; U.S. patent Ser. No. 60/530,823 filed Dec. 18, 2003 entitled "Wireless Display Tag (WDT) Initialization; U.S. patent Ser. No. 60/530,784 filed Dec. 18, 2003 entitled "Wireless Display Tag (WDT) with Environmental Sensors"; U.S. patent Ser. No. 60/530,782 filed Dec. 18, 2003 entitled "High Readability Display for a Wireless Display Tag (WDT)" This application is also related to the following US utility applications filed simultaneously herewith: U.S. patent Ser. No.,) 11/019,660 Filed Dec. 20, 2004 entitled "Error Free Method for Wireless Display Tag (WDT) Initialization"; U.S. patent Ser. No. 11/019,976 filed Dec. 20, 2004 entitled "Wireless Display Tag (WDT) Using Active Backscatter and Transceivers"; U.S. patent Ser. No. 11/019,978 filed Dec. 20, 2004 entitled "Wireless Display Tag (WDT) Unit"; U.S. patent Ser. No. 11/019,916 filed Dec. 20, 2004 entitled "Multi User Wireless Display Tag (WDT) Infrastructure and Methods"; and U.S. patent Ser. No. 11/019,705 filed Dec. 20, 2004 entitled "Low Power Wireless Display Tag (WDT) Systems and Methods".

BACKGROUND OF THE INVENTION

Backscatter transmission is a radio technique whereby signals are sent with typically lower power consumption than comparative techniques. The system requires a Radio Frequency (RF) source, an antenna, a receiver, and a transmitter. Most radio systems include a transmitter and a receiver, both of which are coupled to a logic circuit. The source sends a radio wave over the air using the transmitter. The radio wave propagates from the transmitter's antenna to the receiver's antenna. The impedance terminating the receiver/transmitter's antenna can be in one of three general states: open, short, or the same impedance as the antenna's characteristic impedance. When the impedance characteristic of the antenna matches the characteristic input impedance of the antenna load, then the impedance is considered to be "the same" as the terms is used herein.

Referring now to FIG. 1, an antenna 10 is shown having a termination impedance characteristic that is representative of an open circuit or high impedance. Accordingly, the signal, having a specific electromagnetic wave property, propagates without change.

Referring now to FIG. 2, the antenna 10 is shown employed in a system 20 that has a characteristic termination impedance equal to the characteristic impedance of the antenna 10. Accordingly, the power reflected from the antenna is equal to the power absorbed. The characteristic impedance is created electronically by allowing a controlled current to flow through a diode 22. The impedance is then set to the desired value in response to the amount of direct current. $Z_o$, the characteristic impedance, is set by the diode current as set forth in equation (1):

$$Z_0 = \frac{1}{g_m} = \frac{\frac{KT}{q}}{I_{DC}}$$

K=Boltzman's constant
T=temperature in degrees K
q=electronic charge

Referring now to FIG. 3, the antenna 10 is employed in a system 30 having a characteristic terminating impedance representative of a short or low impedance. Accordingly, the power reflected from the antenna 10 is approximately four times the reflected power value when connected to a system having a characteristic impedance that is the same as the antenna's characteristic impedance. The short is created with a significant amount of current flowing from IDC through the diode 32. The exact value of the short can be described and determined using equation (1) above.

A radio that uses the current art of backscatter requires that direct current be used to create the characteristic impedance and the short circuit. Such systems use power that shortens the battery life and generated a great deal of heat, which becomes a problem in design trends that dictate smaller and more compact components. Compact designs typically call for smaller batteries and reduced heat generation. Thus, what is needed is a system and method that minimizes, or even eliminates, current consumption in order to maximize battery life and reduce heat generation.

SUMMARY OF THE INVENTION

Accordingly, a system and method are disclosed that minimize and even eliminate direct current demands and consumption in order to maximize battery life and reduce heat generation. This invention varies the load impedance on the antenna by electronically connecting either fixed impedances or impedances created using a FET. This is in contrast to the prior art where the impedance was created by changing current value in a device.

An advantage of the present invention is that the system has low power consumption and, hence, low heat generation. Thus, the system is capable of operating with minimum drain on the system battery.

DESCRIPTION OF THE INVENTION

Figure 1:
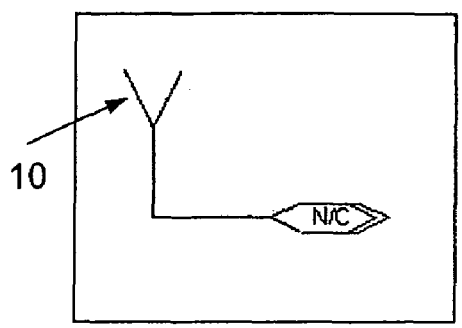
FIG. 1 shows a prior art figure of an antenna with an open or high termination impedance characteristic.
Figure 2:
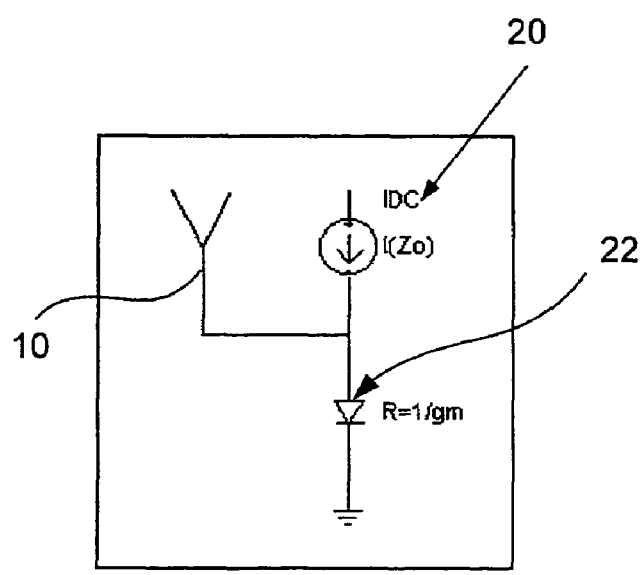
FIG. 2 shows a prior art figure of an antenna with a matching or characteristic termination impedance.
Figure 3:
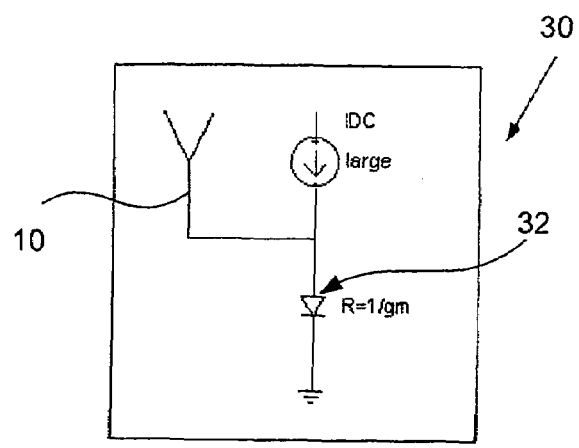
FIG. 3 shows a prior art figure of an antenna with a short or low termination impedance characteristic.
Figure 4:
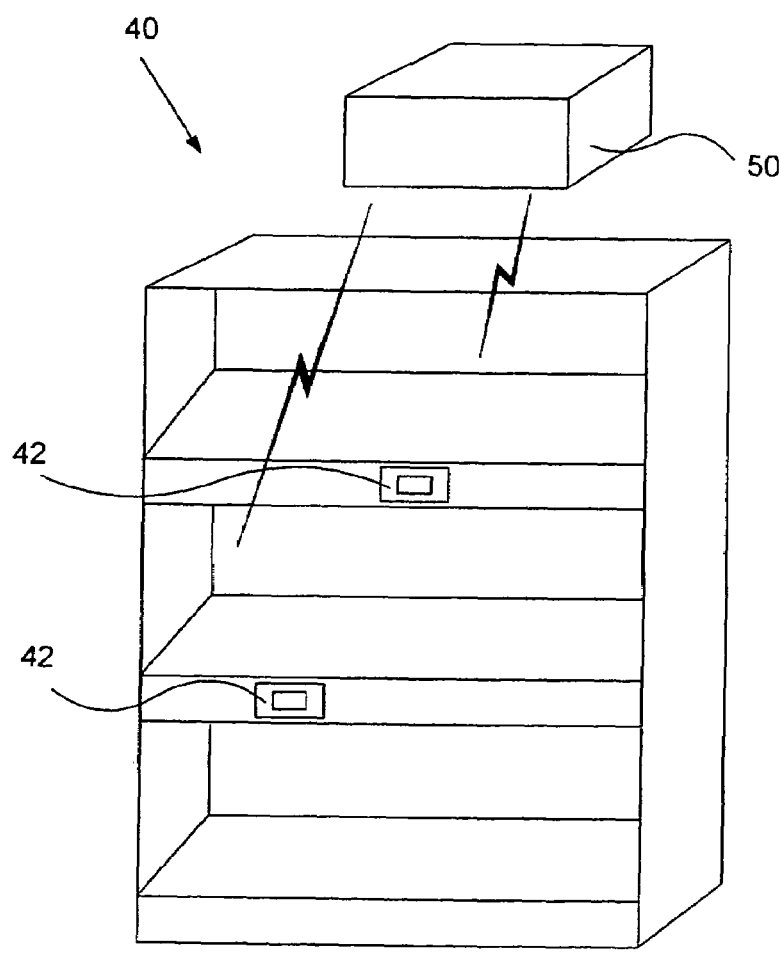
FIG. 4 shows a radio communication system in accordance with the present invention.
Figure 5A:
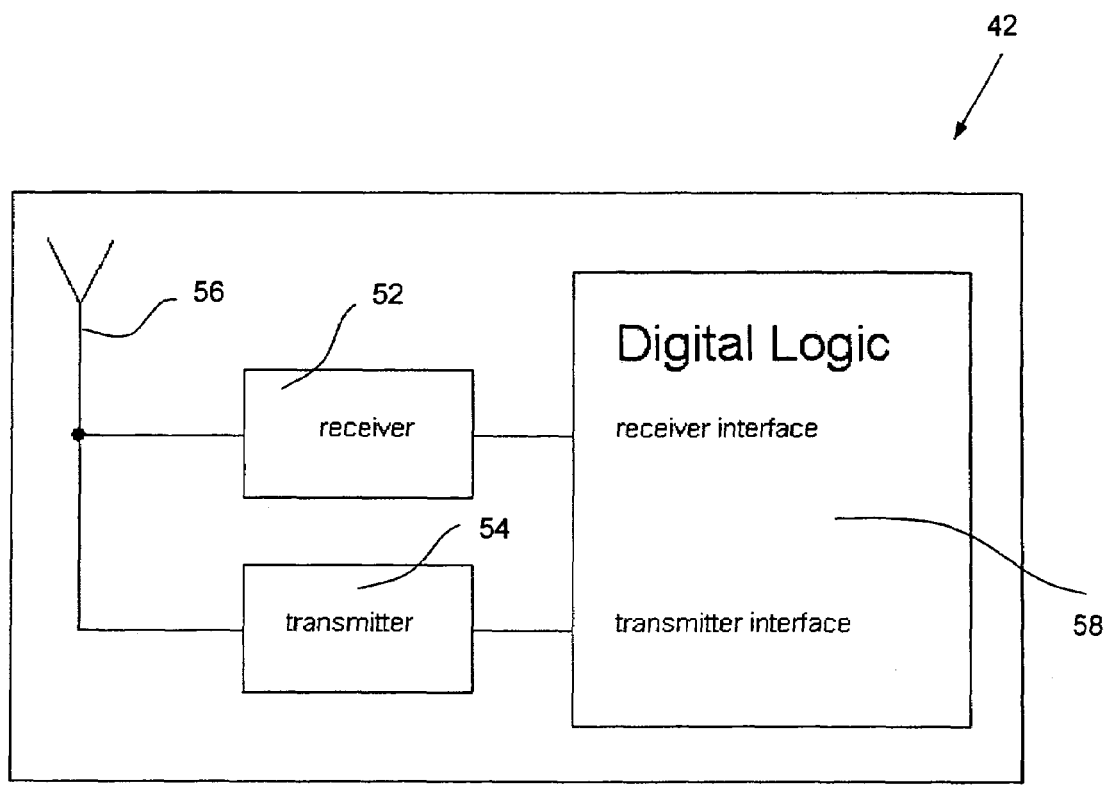
FIG. 5a shows a block diagram representation of a radio transceiver in accordance with the present invention.

Referring now to FIGS. 4 and 5a, a system 40 is shown with radio communication occurring between radio 42, which in some embodiments may be a wireless device adapted to fit within the C-channel of a shelf display, and an access point or wireless terminal 50 in accordance with the teachings of the present invention. Each radio 42 includes a receiver 52 and a transmitter 54, as shown in FIG. 5. As disclosed in U.S. Provisional Application Ser. No. 60/503819 entitled "Wireless Display Tag (WDT) using Amplified Backscatter", filed on even date herewith; U.S. Provisional Application Ser. No. 60/503795 entitled "Wireless Display Tag (WDT) using Active and Backscatter Transceivers", filed on even date herewith; and U.S. Provisional Application Ser. No. 60/503783 entitled "RF Backscatter transmission with Zero DC Power Consumption", filed on even date herewith; all of which are incorporated herein by reference, the radio can include an active transceiver and coupled with a backscatter transceiver.

In a half-duplex environment, with respect to the operation of the radio 42, during the listening stage of the communication cycle, receiver 52 takes the incoming radio information from an antenna 56 and processes the information in a manner that a digital logic unit 58 can utilize. During the transmission stage, as discussed in detail below, the transmitter 54 varies the characteristic impedance of the antenna load that is coupled to the antenna 56 in correspondence to the information that is being transmitted from the radio 42.

Figure 5B:
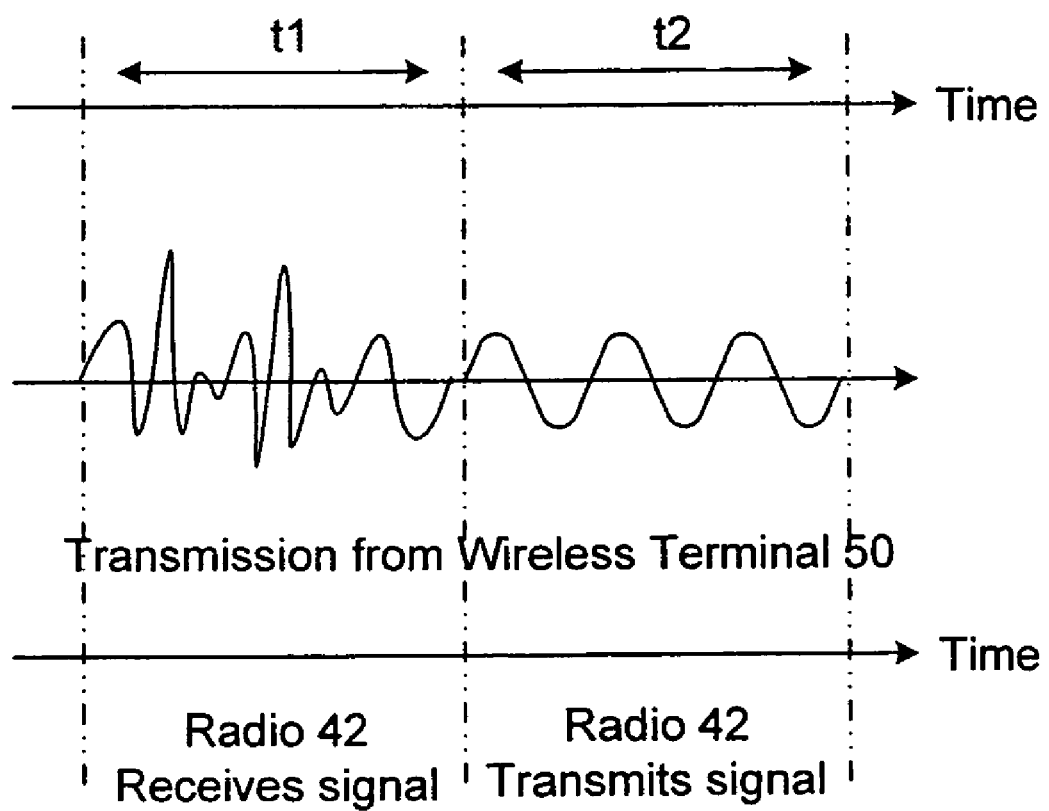
FIG. 5b shows a graph of radio transmission vs. time in accordance with the present invention.

Referring now to FIG. 5b, during the listening stage of the communication, labeled t1, the wireless terminal 50 transmits data to the radio 42. The radio 42 sets the antenna load impedance characteristic to match the impedance of the antenna 56. During the transmission stage, labeled t2, the radio 42 transmits data by varying the antenna load impedance characteristic between a short impedance characteristic and matching impedance characteristic.

Under ideal conditions, there is no DC current flow into the gate or control node of the FET. In order to simulate a digital transmission the load impedance is switched between short and matching load impedance. On the other hand, in order to operate in an analog environment, then the load impedance can vary in the range between short impedance, matching, and open impedance. In an alternative embodiment, the phase and magnitude of the baseband can be altered instead of or in addition to alteration of the antenna load impedance characteristic.

Thus, as detailed above, the transmitter 54 takes data or information from the digital logic unit 58 and processes the information so that the information can be sent wirelessly via the antenna 56 using radio waves. The receiver 52 and transmitter 54 are made primarily with analog circuits. In contrast, the digital logic unit 58 is made with digital circuits.

In the various embodiments that follow, N-channel enhancement mode devices are shown due to the popularity of their use; however, in alternative embodiments, N-channel, P-channel, enhancement, or depletion mode Field Effect Transistors (FETs) can be used. Additionally, CMOS FETs are shown due to their popularity. However, other types of FETs or IgFETs can be used, such as MOSFETs, JFETs, and other types. Different FET technologies can be used besides Silicon, such as GaAs, InGaAs, SOI, plastic transistors, and others.

In order to achieve the desired impedance levels various systems and methods can be utilized. For example, in one embodiment, the FETs are used as low-impedance switches to switch in and out the desired impedances. In another embodiment, the FET's channel impedance is designed to be the desired impedance in order to eliminate the resistor.

Furthermore, in another embodiment, at least one FET can be used as low-impedance switches to switch in and out the desired impedances along with another FET, wherein the channel impedance is designed to be the desired impedance, which would eliminate the resistor. This embodiment can produce either a short or an open characteristic impedance, as desired, by appropriately turning on or off the FET.

An enhancement-mode NMOS FET is turned on by raising the gate or control voltage above the source voltage by at least $v_t$, which is the threshold voltage for the particular FET. On the other hand, the enhancement-mode NMOS FET is turned off when the voltage difference between the gate and source is less than $v_t$. The same is true for a depletion-mode PMOS. The reverse is true for both depletion-mode NMOS and enhancement-mode PMOS.

In alternative embodiments, the FET characteristics are different if the device is operated in triode (linear) mode or saturated mode. In an embodiment where the device is operated in a saturated mode, then the ideal device would have constant-current characteristics.

Figure 5C:
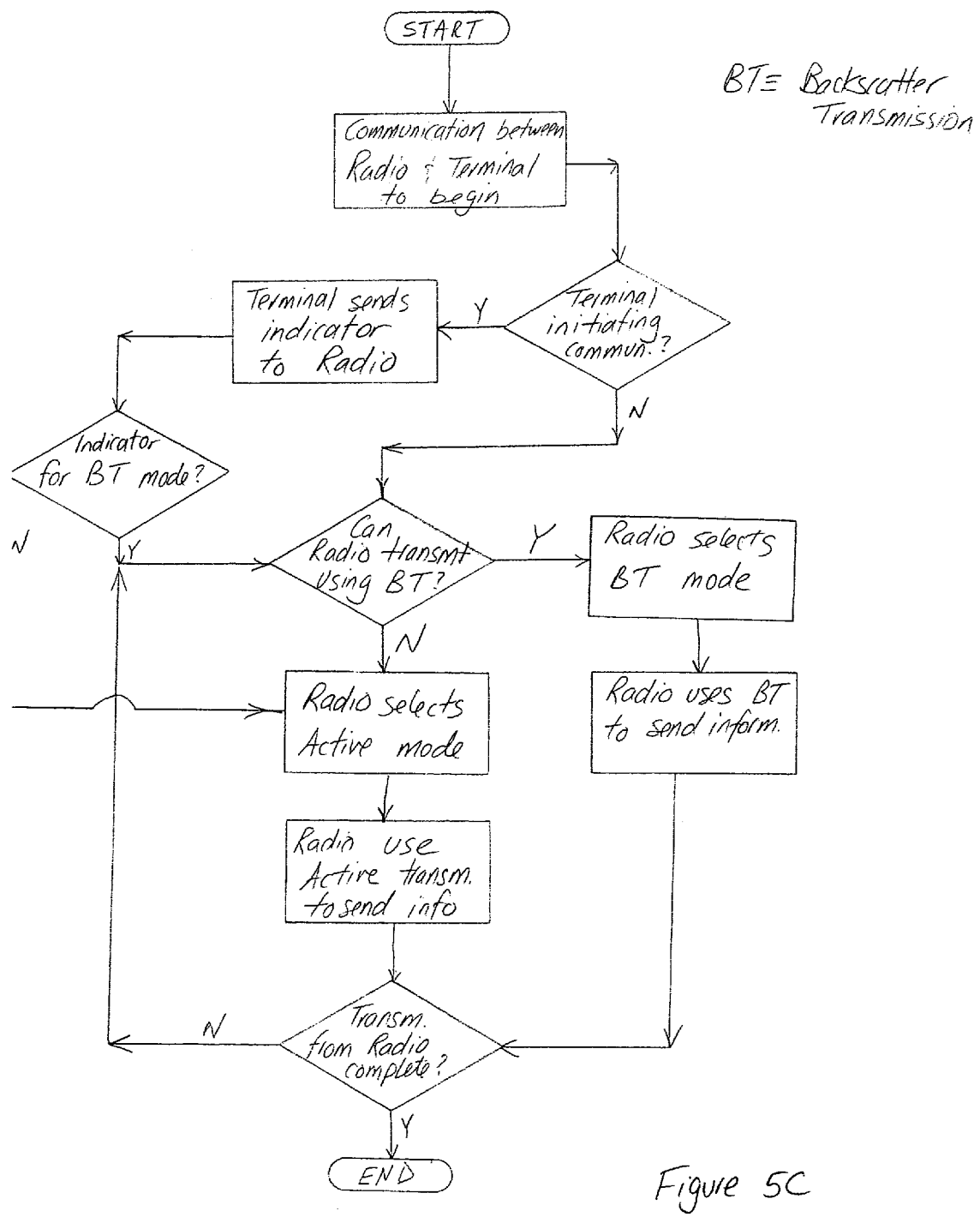
FIG. 5c is a flow chart for a radio communication system in accordance with the present invention.

Referring now to FIG. 5c, the process of determining the communication mode between the radio and terminal begins at step 500. At step 502, communication between the radio and the terminal is initiated. At step 504, if the terminal initiated the communication, then the terminal sends an indicator signal to the radio at step 506; if not, then the process moves to step 510, as discussed below. At step 508 it is determined if the indicator signal transmitted to the radio from the terminal is an indicator to communicate in backscatter mode. If the indicator signal is an indication to communicated in back scatter mode, then at step 510 it is determined if the radio can transmit using backscatter; if not, then the radio selects active mode transmission at step 516, as discussed below.

If the radio can transmit using backscatter mode, then at step 512 the radio selects to transmit in backscatter mode. At step 514, the radio uses backscatter mode to transmit or send information to a nearby device, such as the terminal. At step 520, if the transmission from the radio is complete, then the process ends at step 522; otherwise the process returns to step 510 to determine if the radio can continue to transmit using backscatter. If at step 510 it is determined that the radio can not transmit in backscatter, then at step 516 the radio selects active mode and at step 518 the radio uses active transmission to send information to the terminal.

With respect to FIG. 6, 7, 8, 9, and 10 that follow, the embodiments contemplate systems deployed in environments wherein the signal has low voltage or small radio signals are present. Thus, the system is operating in the triode mode region of the current-voltage (I-V) characteristics of inherently small-signal operation. In this mode, the channel resistance, which is the small-signal resistance between the source and the drain of the FET is approximately linear. The operation is over two diagonally-opposed quadrants of operation that is defined by a near-linear I-V characteristic response.

With respect to FIGS. 11, 12, 13, 14, 15, 16, 17, 18, 19 and 20, alternative embodiments are shown with the system operating in an environment wherein the signal has high voltage. Thus, if the FET device is large enough with relatively low resistance, this mode approximates a low impedance characteristic or a short circuit and this is large-signal operation. The operation of the FET and its I-V characteristic curve is non-linear and operates in one quadrant of the I-V characteristic.

Figure 6:
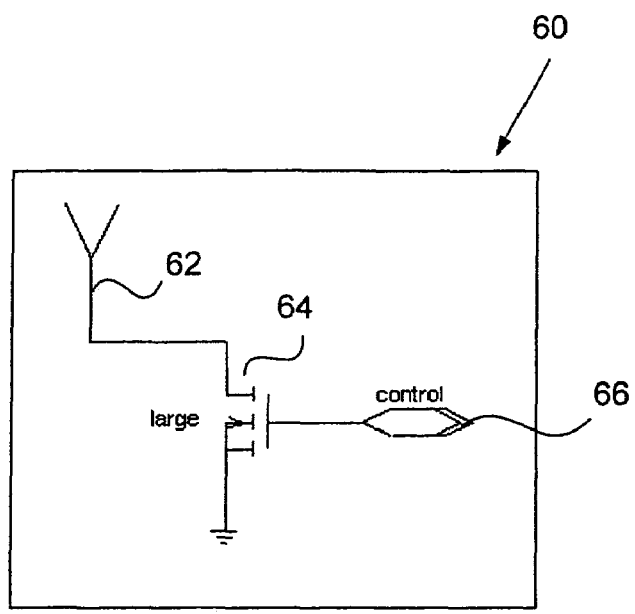
FIG. 6 shows a transmitter portion of the radio transceiver of FIG. 5 with an open or a high, or low impedance characteristic in accordance with the present invention.

Referring now to FIG. 6, a system 60 is an embodiment wherein the antenna load characteristic impedance, which is measured relative to the impedance characteristic of an antenna 62, can be varied or switched from short to matching to open using a Field Effect Transistor (FET) 64. In the system 60, the antenna 62 is coupled to the FET 64. The FET 64 is coupled to and controlled by control signals from a control unit 66. When an open impedance characteristic is desired, the control signal is connected to ground, turning off the FET 64. When a short or low impedance characteristic is desired, then the control signal is set high turning on the FET 64, thereby shorting the antenna 62 to ground.

Figure 7:
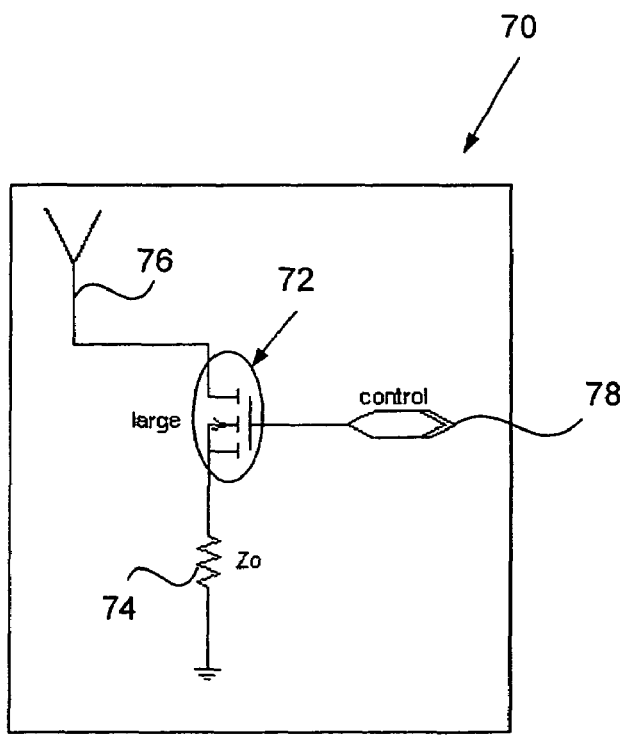
FIG. 7 shows a transmitter portion of the radio transceiver of FIG. 5 with a matching characteristic or open impedance in accordance with the present invention.

Referring now to FIG. 7, a system 70 is shown wherein the characteristic impedance is created with a FET 72 and a resistor 74. The FET 72 is designed to have a low source-to-drain impedance. The resistor 74 is connected between the source of the FET 72 and ground. The value of the resistor 74 is equal to the characteristic impedance of an antenna 76. When the characteristic impedance, which is the load characteristic impedance that matches the characteristic impedance of the antenna 76, is desired the control signal voltage from the control unit 78 is set to high voltage. Otherwise, the control is set to low voltage.

Figure 8:
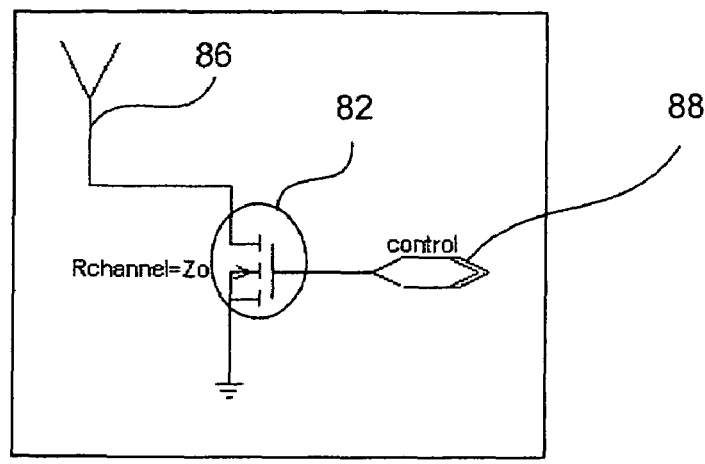
FIG. 8 shows a transmitter portion of the radio transceiver of FIG. 5 with a matching impedance characteristic or open impedance in accordance with the present invention.

Referring now to FIG. 8, a system 80 is shown with an FET 82 coupled to an antenna 86 and a control unit 88 for generating control signals. The FET's characteristic impedance can be chosen to be equal to the desired characteristic impedance, which is the same as the impedance of the antenna 86. Accordingly, when the characteristic impedance is desired, the control signal from a control unit 88 is set high. Otherwise, the control signal from the control unit 88 is set low.

Figure 9:
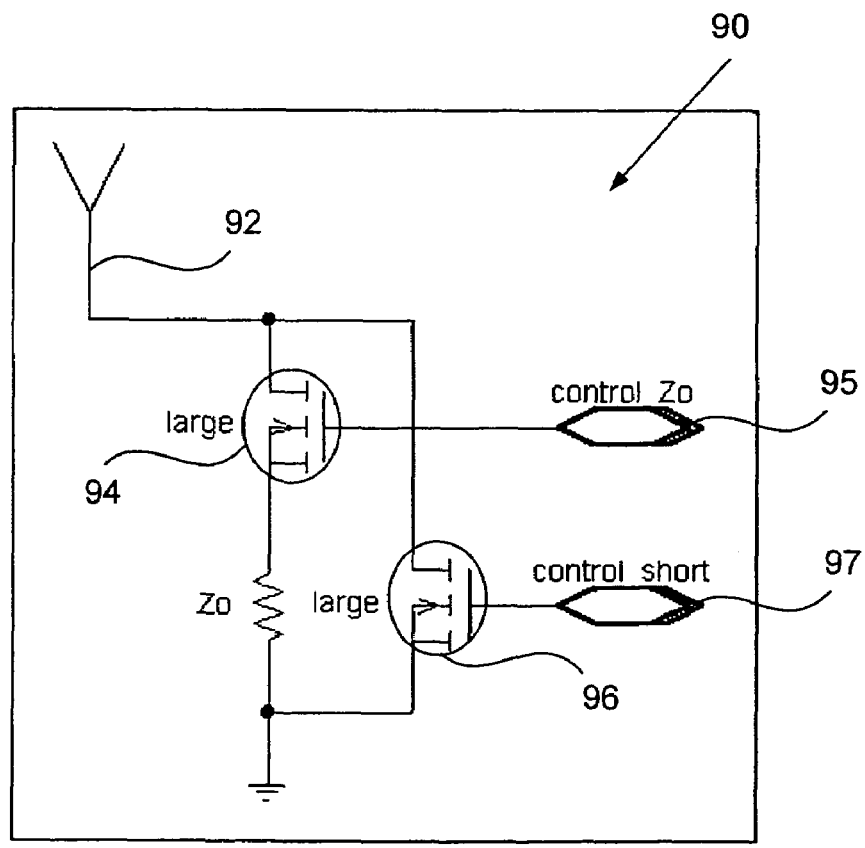
FIG. 9 shows a transmitter portion of the radio transceiver of FIG. 5 with a combined implementation of characteristic impedance, short or open impedance in accordance with the present invention.

Referring now to FIG. 9, a system 90 is shown with an antenna 92 coupled to an FET 94 and an FET 96. The FET 94 is coupled to a control unit 95 and the FET 96 is coupled to a control unit 97. When an open or high impedance characteristic is desired, the control signals from the control units 95 and 97 are low. Alternatively, when a short or low impedance characteristic is desired, the control signal from the control unit 97 is set to high voltage and the control signal from the control unit 95 is set to low voltage. If a characteristic impedance is desired, other than an open or short, high or low characteristic impedance respectively, then the control signal from the control unit 97 is set to low voltage and the control signal from the control unit 95 is set to high voltage. In an alternative embodiment, a digital logic circuit can be implemented if desired using a similar approach.

Figure 10:
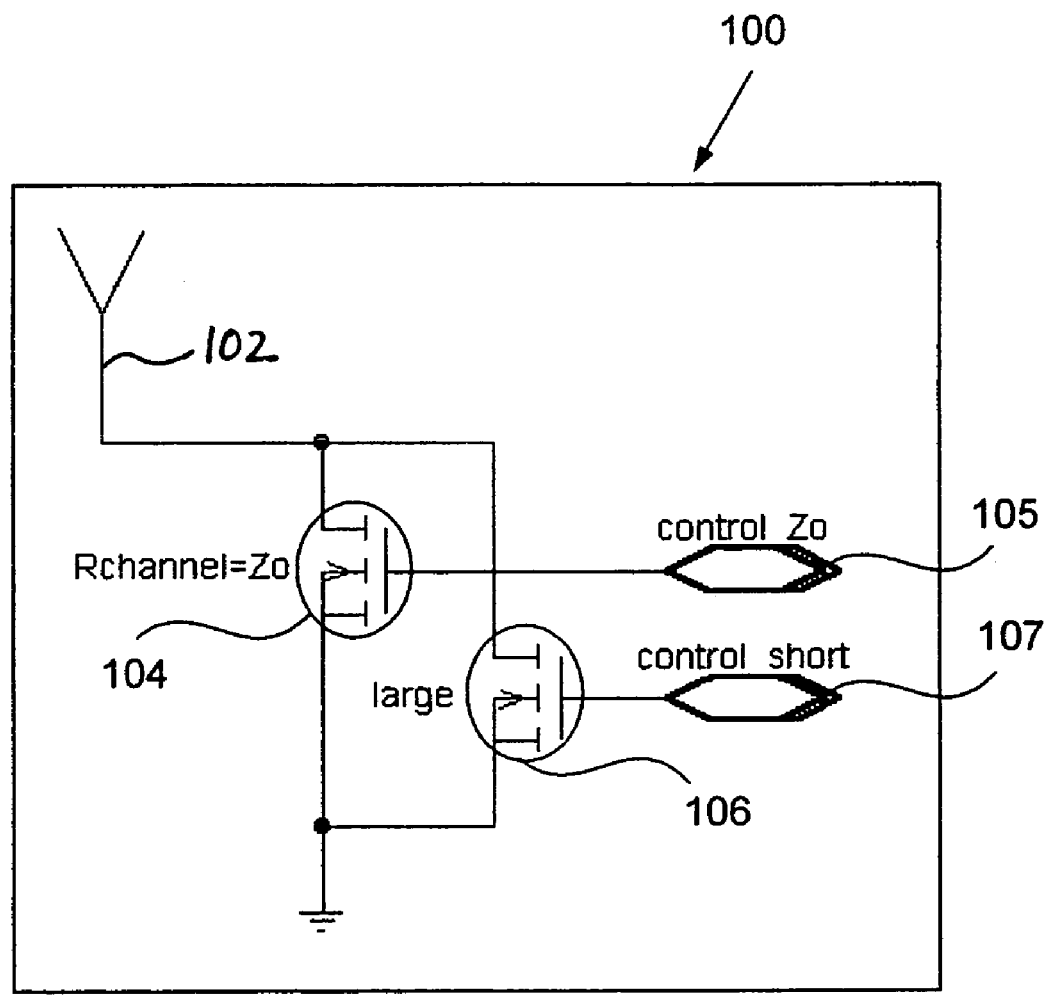
FIG. 10 shows a transmitter portion of the radio transceiver of FIG. 5 with a combined implementation of characteristic impedance, short, or open impedance in accordance with the present invention.

Referring now to FIG. 10, a system 100 is shown with an antenna 102 coupled to an FET 104 and an FET 106. The FET 104 and the FET 106 receive control signals from the control units 105 and 107, respectively. When an open or high impedance characteristic is desired, the control signals from the both the control units 105 and 107 are low. When a short or low impedance characteristic is desired, the control signal from the control unit 107 is high, and the control signal from the control unit 105 is low. On the other hand, when a characteristic impedance is desired, the control signal from the control unit 107 is low, and the control signal from the control unit 105 is high. In an alternative embodiment, a digital logic circuit can be implemented if desired.

The previous circuits are less effective with large RF signals when the DC voltage on the antenna is zero volts. The reason is because the MOS current-voltage characteristics change when the devices are "reverse biased" by the antenna voltage going negative. If the RF voltages are small, then there is little undesired effect. However, if the RF signal at the antenna is large, then the undesired effect is noticeable.

In alternative embodiments, the system includes using negative voltages at the antenna. The alternative circuits are shown and discussed in detail below. The circuits use enhancement mode FETs. However, circuits are also shown that use the enhancement/depletion mode devices.

Figure 11:
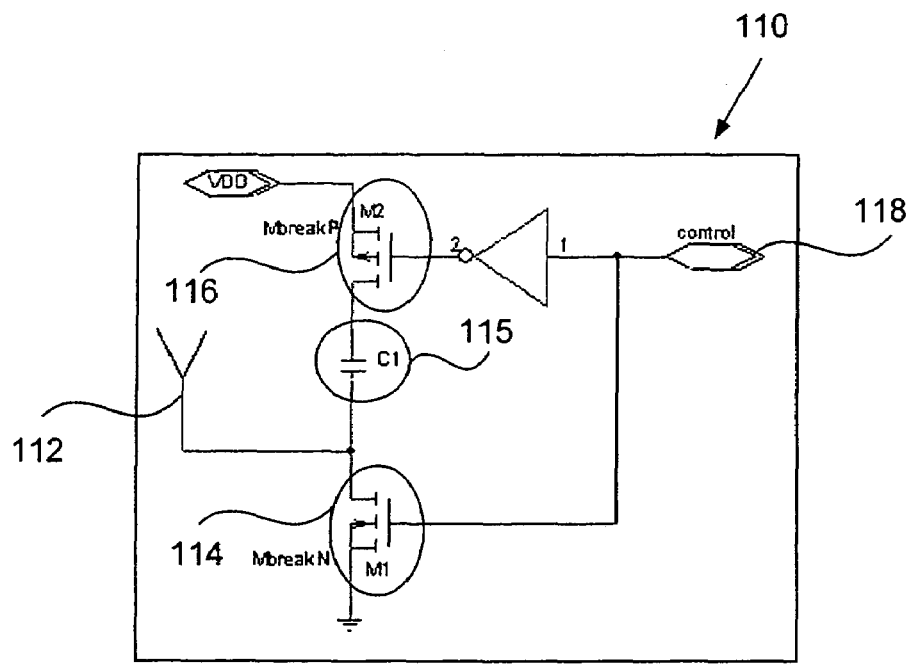
FIG. 11 shows a transmitter portion of the radio transceiver of FIG. 5 having an enhancement-mode CMOS with a short or low impedance characteristic or open impedance in accordance with the present invention.
Figure 12:
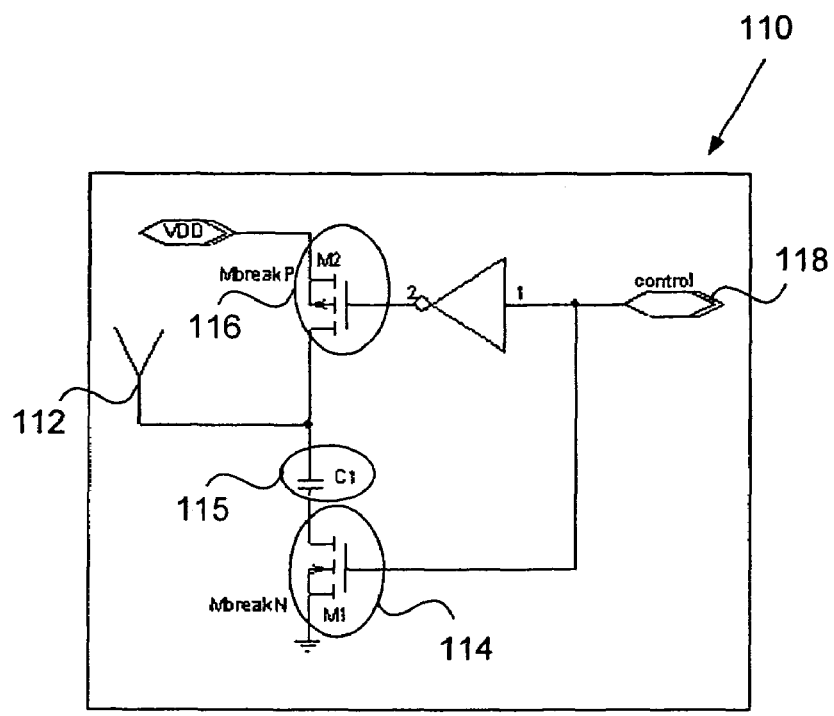
FIG. 12 shows a transmitter portion of the radio transceiver of FIG. 5 having an enhancement-mode CMOS with a short or low impedance characteristic or open impedance in accordance with the present invention.

Referring now to FIGS. 11 and 12, a system 110 includes an antenna 112 coupled to a device 114 and a device 116. In one embodiment the devices 114 and 116 are standard enhancement-mode devices. When the control signal from a control unit 118 is low, an open impedance characteristic is presented to the antenna 112. When the control signal from the control unit 118 is high, a short is presented to the antenna 112.

When the control signal is low, both the device 114 and the device 116 are off, so that virtually no current flows between the drain and the source of the FET. With a high control signal, device 114 turns on and shorts the antenna 112 to ground; likewise, device 116 turns on. However, a capacitor 115 prevents direct current flow from the drain side of the device 116 to the antenna 112. In one embodiment, the capacitors is shown in one instance connected between the antenna 112 and the drain of the device 116; in an alternative embodiment the capacitor 115 is shown connected between the antenna 112 and the drain of the device 114. In FIG. 11, the antenna is at 0 $V_{DC}$, while in FIG. 12 the antenna is at approximately $V_{DD}$.

Even though direct current (DC) can not flow through the capacitor 115, current that results from the radio frequency can flow through capacitor 115. Accordingly, the capacitance of the capacitor 115 is selected so that the capacitor 115 presents a low-impedance at the operating radio frequency.

In an alternative embodiment, the system 110 can be used to terminate an antenna coupled to the devices 114 and 116 at the characteristic impedance by sizing the device 114 and the device 116.

Figure 13:
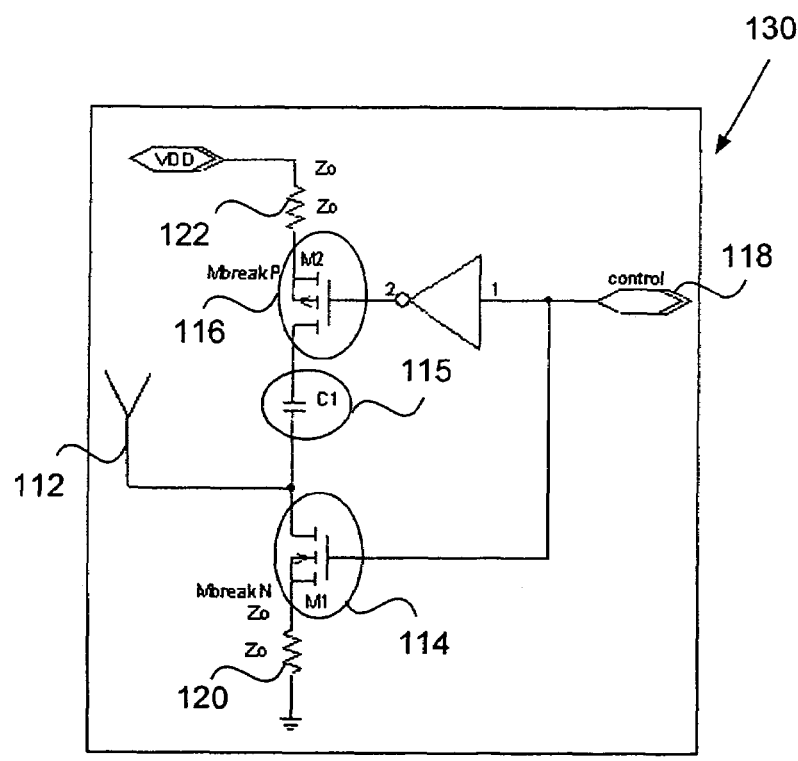
FIG. 13 shows a transmitter portion of the radio transceiver of FIG. 5 having an enhancement-mode CMOS with an open or matched characteristic impedance characteristic in accordance with the present invention.
Figure 14:
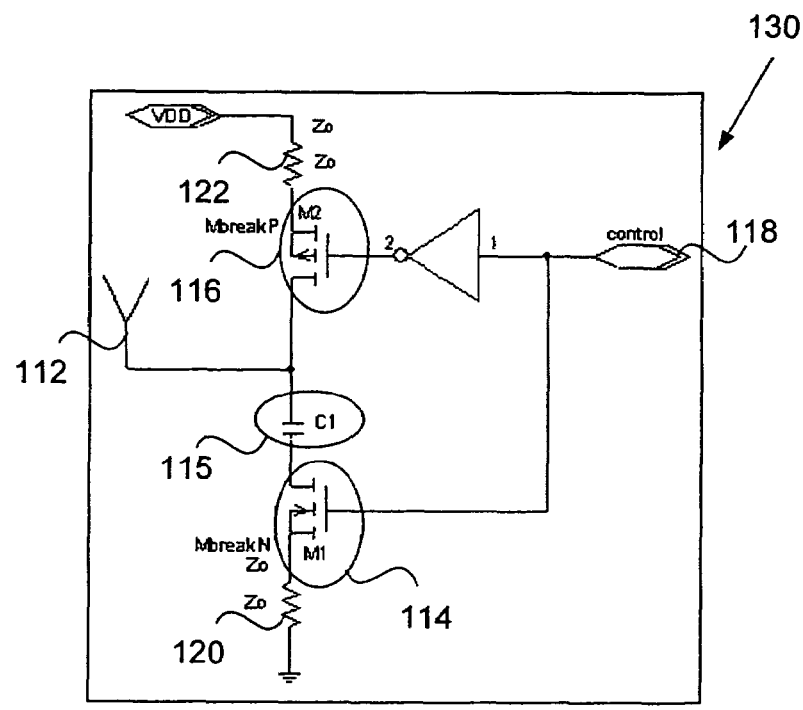
FIG. 14 shows a transmitter portion of the radio transceiver of FIG. 5 having an enhancement-mode CMOS with an open or matched characteristic impedance characteristic in accordance with the present invention.

Referring now to FIGS. 13 and 14, a system 130 includes the device 114 and the device 116, wherein the devices 114 and 116 function as open or short circuits depending on the control signals from the control unit 118 while the resistors 120 and 122 set the characteristic impedance. Alternative embodiments are possible wherein the capacitor 115 is switched from the drain of the device 114 to the drain of the device 116.

Figure 15:
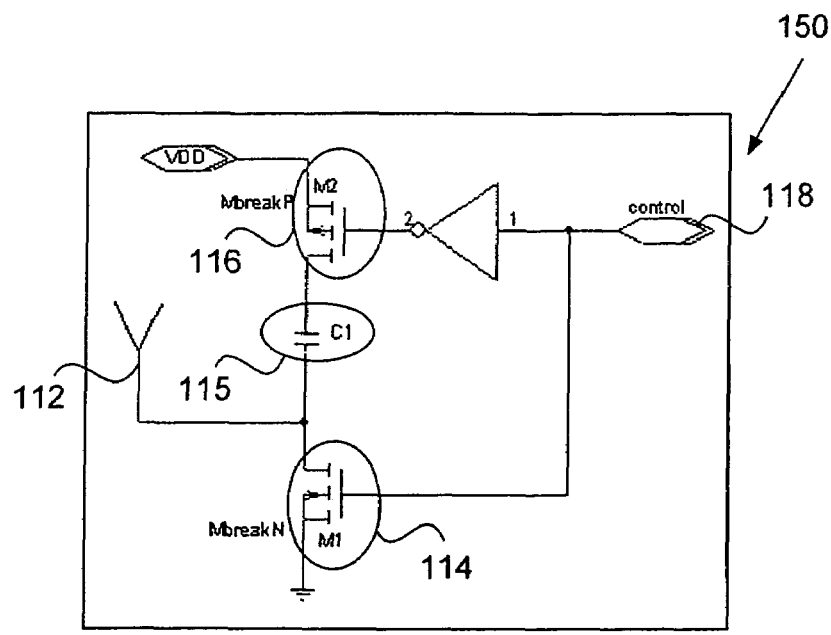
FIG. 15 shows a transmitter portion of the radio transceiver of FIG. 5 having an enhancement-mode CMOS with an open, shorted, or matched characteristic impedance characteristic in accordance with the present invention.
Figure 16:
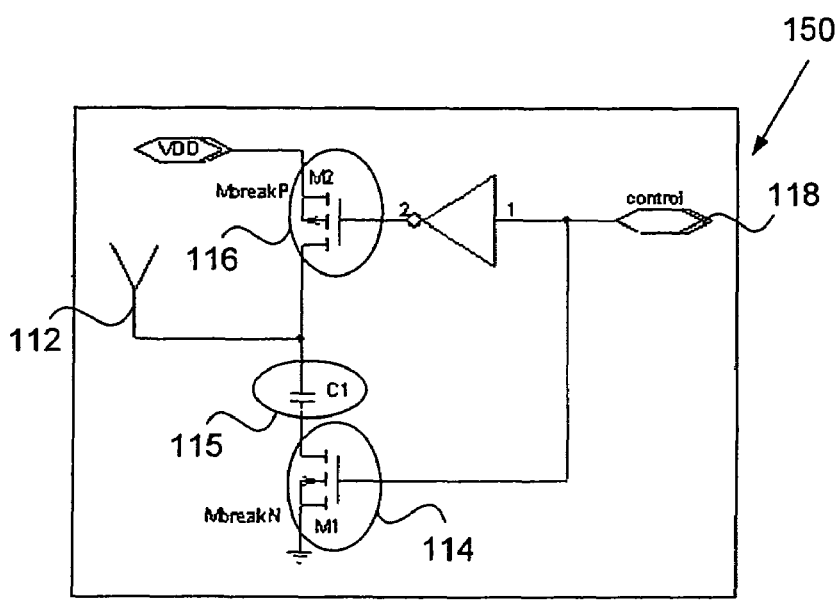
FIG. 16 shows a transmitter portion of the radio transceiver of FIG. 5 having an enhancement-mode CMOS with an open, shorted, or matched characteristic impedance characteristic in accordance with the present invention.
Figure 17:
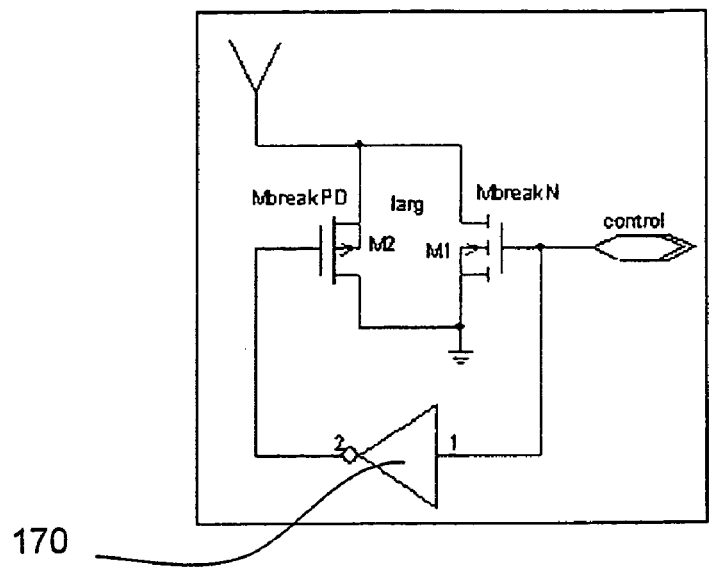
FIG. 17 shows a transmitter portion of the radio transceiver of FIG. 5 having an enhancement and depletion mode CMOS with a short or low impedance characteristic, or open impedance in accordance with the present invention.
Figure 18:
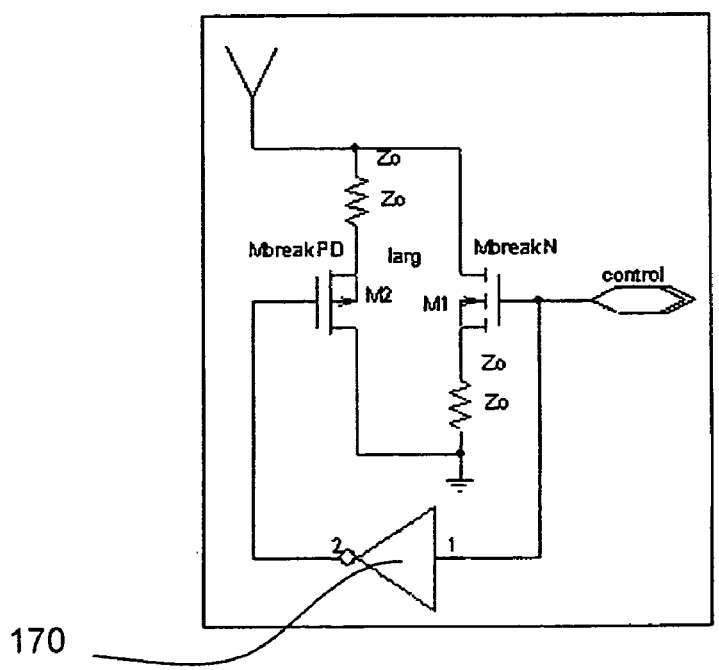
FIG. 18 shows a transmitter portion of the radio transceiver of FIG. 5 having a enhancement and depletion mode CMOS with a matching or open impedance characteristic in accordance with the present invention.
Figure 19:
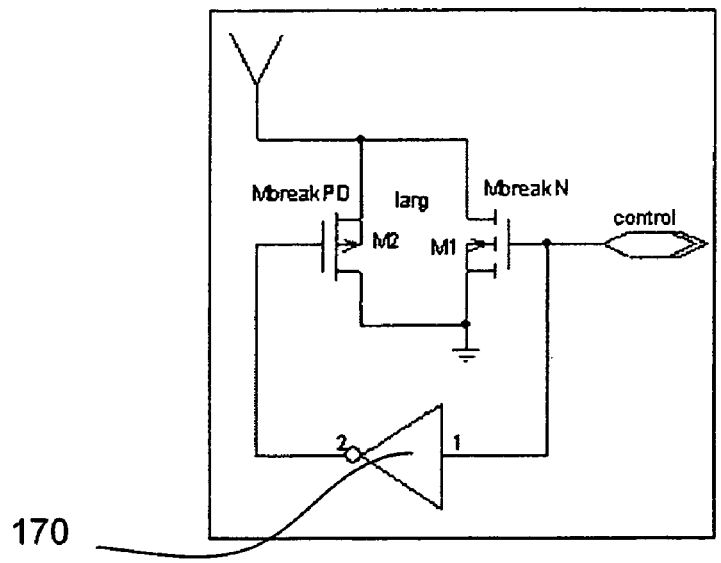
FIG. 19 shows a transmitter portion of the radio transceiver of FIG. 5 having an enhancement and depletion mode CMOS with a short or low impedance characteristic, or open impedance in accordance with the present invention.
Figure 20:
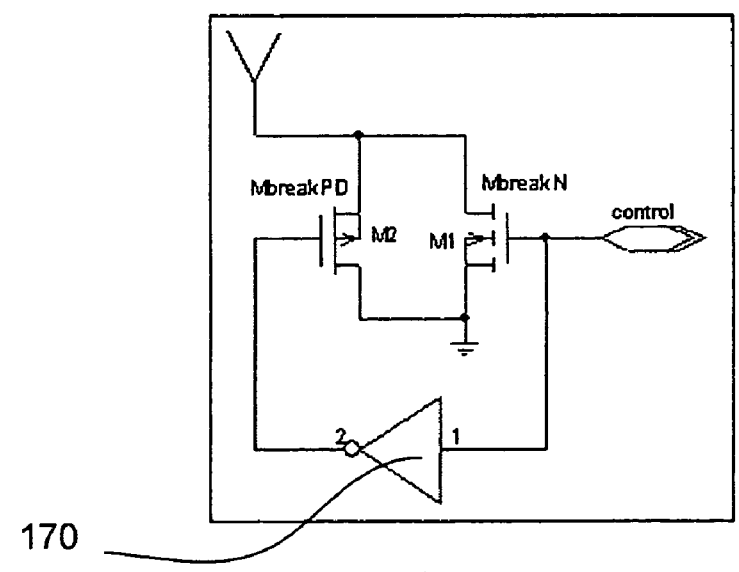
FIG. 20 shows a transmitter portion of the radio transceiver of FIG. 5 having an enhancement and depletion mode CMOS with a matching or open impedance characteristic, or open impedance in accordance with the present invention.

Referring now to FIGS. 15 and 16, the characteristic impedance of the antenna 112 of the system 150 is matched by the correct sizing of the device 114 and the device 116. As indicated, alternative embodiments are possible wherein the capacitor 115 is switched from the drain of the device 114 to the drain of the device 116.

Referring now to FIGS. 17, 18, 19, and 20, if enhancement and depletion-mode devices are available, then alternative circuits can be used. As indicated above, in a depletion mode device, as the control signal voltage is increased, the depletion mode device gets closer to proximating as open or high impedance characteristic. Thus, the embodiments disclosed herein are similar to those using enhancement mode devices and includes a voltage inverter 170 for inverting the control signal that is sent to the depletion mode device.

Having fully described various embodiment and various alternatives, those skilled in the art will recognize, given the teachings herein that numerous alternatives and variations exist that do not depart from the invention and it is therefore intended that the invention not be limited by the forgoing description.

We claim:

1. In a transmitter-receiver circuit, for transmitting and receiving through an antenna, a method of minimizing power consumption comprising:

setting an antenna load impedance to match the impedance of the antenna; and varying the antenna load impedance between a short impedance and a matching impedance, wherein the circuit is capable of operating in backscatter mode;

wherein the varying step includes varying the antenna load impedance in the range between short impedance, matching, and open impedance.

2. The method of claim 1 wherein the varying step comprises switching the short and the matching impedances into and out of the circuit.

3. The method of claim 2 wherein the switching step includes applying a voltage to the gate of a FET.

4. The transmitter-receiver circuit of claim 1 wherein the circuit is capable of half-duplex communication.

5. A transmitter-receiver circuit comprising:

a transmitter-receiver for transmitting and receiving through an antenna having an impedance;

switching logic coupled between the antenna and the transmitter-receiver, the switching logic adapted to establish an antenna load impedance which matches the antenna impedance during a listening portion of a half-duplex cycle, and, during the transmit portion of the half-duplex cycle, and, to vary the antenna load impedance between a short and a match to the antenna impedance, wherein the transmitter-receiver is capable of operating in backscatter mode; and generating a baseband having a phase and magnitude and varying the phase and magnitude thereof.

6. The transmitter-receiver circuit of claim 5 wherein the transmitter-receiver is a half-duplex transmitter-receiver.

7. A transmitter-receiver circuit, as recited in claim 5, wherein the switching logic includes a Field Effect Transistor (FET) having a gate to which voltage is applied for causing the establishing of the load impedance.

8. A transmitter-receiver circuit, as recited in claim 5, wherein the FET is N-channel, P-channel, enhancement or depletion mode transistor.

9. A transmitter-receiver circuit, as recited in claim 5, wherein the FET is a MOSFET, IgFET or JFET transistor.

10. A transmitter-receiver circuit, as recited in claim 5, wherein the FET is made of silicon, GaAs, InFaAs, SOI, or plastic transistors.

11. A transmitter-receiver circuit comprising:

a transmitter-receiver for transmitting and receiving through an antenna capable of operating in half-duplex mode at a baseband having a phase and a magnitude; and logic for varying the magnitude and the phase of the baseband as applied to the antenna, wherein the transmitter-receiver is capable of operating in backscatter mode;

wherein the logic can vary the antenna load impedance in the range between short impedance, matching, and open impedance.

12. The transmitter-receiver circuit of claim 11 further including switching logic coupled between the antenna and the transmitter-receiver for varying an antenna load impedance in accordance with portions of the half-duplex cycle.

13. A transmitter-receiver circuit, as recited in claim 11, further including an antenna.

14. A transmitter-receiver circuit, as recited in claim 11, wherein the transmitter-receiver is a half-duplex transmitter-receiver.

15. A transmitter-receiver circuit, as recited in claim 11, wherein the logic includes a Field Effect Transistor (FET) having a gate to which voltage is applied.

16. A transmitter-receiver circuit, as recited in claim 15, wherein the FET is N-channel, P-channel, enhancement or depletion mode transistor.

17. In a transmitter-receiver circuit, for transmitting and receiving through an antenna, a method of minimizing power consumption comprising:

setting an antenna load impedance to match the impedance of the antenna;

varying the antenna load impedance between a short impedance and a matching impedance, wherein the circuit is capable of operating in backscatter mode; and generating a baseband having a phase and magnitude and varying the phase and magnitude thereof.

* * * * *